US010385985B2

(12) United States Patent
Miyachi et al.

(10) Patent No.: US 10,385,985 B2
(45) Date of Patent: *Aug. 20, 2019

(54) VALVE OPENING AND CLOSING TIMING CONTROL APPARATUS

(71) Applicant: AISIN SEIKI KABUSHIKI KAISHA, Kariya-shi, Aichi-ken (JP)

(72) Inventors: Eiji Miyachi, Nishio (JP); Hiroki Mukaide, Chiryu (JP); Tomoharu Otake, Kariya (JP); Yoshiaki Iguchi, Kariya (JP); Shigemitsu Suzuki, Takahama (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 30 days.

This patent is subject to a terminal disclaimer.

(21) Appl. No.: 15/704,298

(22) Filed: Sep. 14, 2017

(65) Prior Publication Data

US 2018/0073655 A1    Mar. 15, 2018

(30) Foreign Application Priority Data

Sep. 15, 2016    (JP) ................................ 2016-180760

(51) Int. Cl.
*F16K 31/04*    (2006.01)
*F01L 1/047*    (2006.01)
(Continued)

(52) U.S. Cl.
CPC ............ *F16K 31/043* (2013.01); *F01L 1/047* (2013.01); *F01L 1/344* (2013.01); *F01L 1/352* (2013.01);
(Continued)

(58) Field of Classification Search
CPC ...... F16K 31/043; F16K 31/048; F01L 1/047; F01L 1/344; F01L 1/352; F01L 2820/032;
(Continued)

(56) References Cited

U.S. PATENT DOCUMENTS 6,328,008 B1 *    12/2001    Io ............................... F01L 1/34
                                                                    123/90.17
7,603,975 B2    10/2009    Sugiura et al.
(Continued)

FOREIGN PATENT DOCUMENTS

JP    2008-038886 A    2/2008
JP    2012-189050 A    10/2012
(Continued)

OTHER PUBLICATIONS

U.S. Appl. No. 15/704,354, filed Sep. 14, 2017, Eiji Miyachi et al.
(Continued)

*Primary Examiner* — Hung Q Nguyen
(74) *Attorney, Agent, or Firm* — Buchanan Ingersoll & Rooney PC

(57) ABSTRACT

A valve opening and closing timing control apparatus includes: a driving side rotator disposed rotatably about a rotation axis and configured to rotate synchronously with a crankshaft; a driven side rotator disposed rotatably about the rotation axis and configured to be rotatable relative to the driving side rotator and to rotate integrally with a valve opening/closing camshaft; a phase adjustment mechanism configured to set a relative rotation phase between the driving side and driven side rotators by a driving force of an electric actuator, a biasing member provided on an outer periphery of a drive shaft to apply a biasing force in a direction such that an inner gear is engaged with a ring gear; and a displacement regulation portion configured to regulate a displacement of the inner gear.

6 Claims, 7 Drawing Sheets

(51) Int. Cl.
  *F01L 1/344*   (2006.01)
  *F01L 1/352*   (2006.01)
(52) U.S. Cl.
  CPC ......... *F16K 31/048* (2013.01); *F01L 2250/02* (2013.01); *F01L 2250/04* (2013.01); *F01L 2810/04* (2013.01); *F01L 2820/032* (2013.01)
(58) Field of Classification Search
  CPC ............... F01L 2810/04; F01L 2250/04; F01L 2250/02
  See application file for complete search history.

(56) References Cited

U.S. PATENT DOCUMENTS

| | | | |
|---|---|---|---|
| 2017/0138228 A1 | 5/2017 | Miyachi et al. | |
| 2018/0073656 A1* | 3/2018 | Miyachi | ............... F16K 31/047 |

FOREIGN PATENT DOCUMENTS

| | | | |
|---|---|---|---|
| JP | 2013083171 A | 5/2013 | |
| JP | 2016-044627 A | 4/2016 | |

OTHER PUBLICATIONS

Extended European Search Report issued by the European Patent Office dated Feb. 7, 2018 in corresponding European Patent Application No. 17190997.1 (10 pages).

* cited by examiner

VALVE OPENING AND CLOSING TIMING CONTROL APPARATUS

CROSS REFERENCE TO RELATED APPLICATIONS

This application is based on and claims priority under 35 U.S.C. § 119 to Japanese Patent Application 2016-180760, filed on Sep. 15, 2016, the entire contents of which are incorporated herein by reference.

TECHNICAL FIELD

This disclosure relates to a valve opening and closing timing control apparatus, which sets a relative rotation phase between a driving side rotator and a driven side rotator by a driving force of an electric actuator.

BACKGROUND DISCUSSION

As a valve opening and closing timing control apparatus having the configuration described above, JP 2008-038886A (Reference 1) discloses a technology of a differential speed reduction mechanism in which a ring gear (an internal toothed gear in Reference 1) is disposed coaxially with a rotation axis, an inner gear (a planetary gear in Reference 1) is disposed coaxially with an eccentric axis, which has the posture parallel to the rotation axis, a portion of an external toothed portion of the inner gear is engaged with a portion of an internal toothed portion of the ring gear, and a drive shaft (a planetary carrier in Reference 1) is fitted into the inner gear.

In this technology, a biasing member (a spring member in Reference 1) is disposed so as to be fitted into a region of the outer periphery of the drive shaft that corresponds to the area in which the external toothed portion of the inner gear is engaged with the internal toothed portion of the ring gear. Thereby, a biasing force is applied to the direction in which the internal toothed portion and the external toothed portion are engaged with each other. In particular, Reference 1 describes that a biasing direction of the biasing member is set so as to offset a fluctuation torque applied from an intake valve.

In the configuration described in Reference 1, the biasing force of the biasing member is set so as to allow the ring gear and the inner gear to maintain the engaged state thereof against an engagement reaction force. Thus, the internal toothed portion and the external toothed portion come into strong contact with each other, which increases engagement loss.

In addition, in a configuration in which the outer periphery of the drive shaft is brought into contact with the inner periphery of the inner gear over a long area, the frictional resistance of the contact area is increased by the biasing force of the biasing member. For this reason, when the electric actuator is driven, the rotational speed is suppressed, causing deterioration in responsiveness, and there is room for improvement.

Thus, a need exists for a valve opening and closing timing control apparatus which is not susceptible to the drawback mentioned above.

SUMMARY

A feature of an aspect of this disclosure resides in that a valve opening and closing timing control apparatus includes a driving side rotator disposed rotatably about a rotation axis and configured to rotate synchronously with a crankshaft of an internal combustion engine, a driven side rotator disposed rotatably about the rotation axis and configured to be rotatable relative to the driving side rotator and to rotate integrally with a valve opening/closing camshaft of the internal combustion engine, and a phase adjustment mechanism configured to set a relative rotation phase between the driving side rotator and the driven side rotator by a driving force of an electric actuator, wherein the phase adjustment mechanism includes an internal toothed ring gear disposed coaxially with the rotation axis, an inner gear disposed coaxially with an eccentric axis in a posture parallel to the rotation axis such that an external toothed portion thereof is engaged with a portion of an internal toothed portion of the ring gear, and a drive shaft fitted into the inner gear, wherein the phase adjustment mechanism is configured with a differential speed reduction mechanism in which the drive shaft is rotated about the rotation axis by the driving force of the electric actuator such that the inner gear revolves around the rotation axis while spinning on the eccentric axis, and wherein the valve opening and closing timing control apparatus further includes a biasing member provided on an outer periphery of the drive shaft to apply a biasing force in a direction such that the external toothed portion of the inner gear is engaged with the internal toothed portion of the ring gear, and a displacement regulation portion configured to regulate a displacement of the inner gear on the basis of the drive shaft in a biasing direction of the biasing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
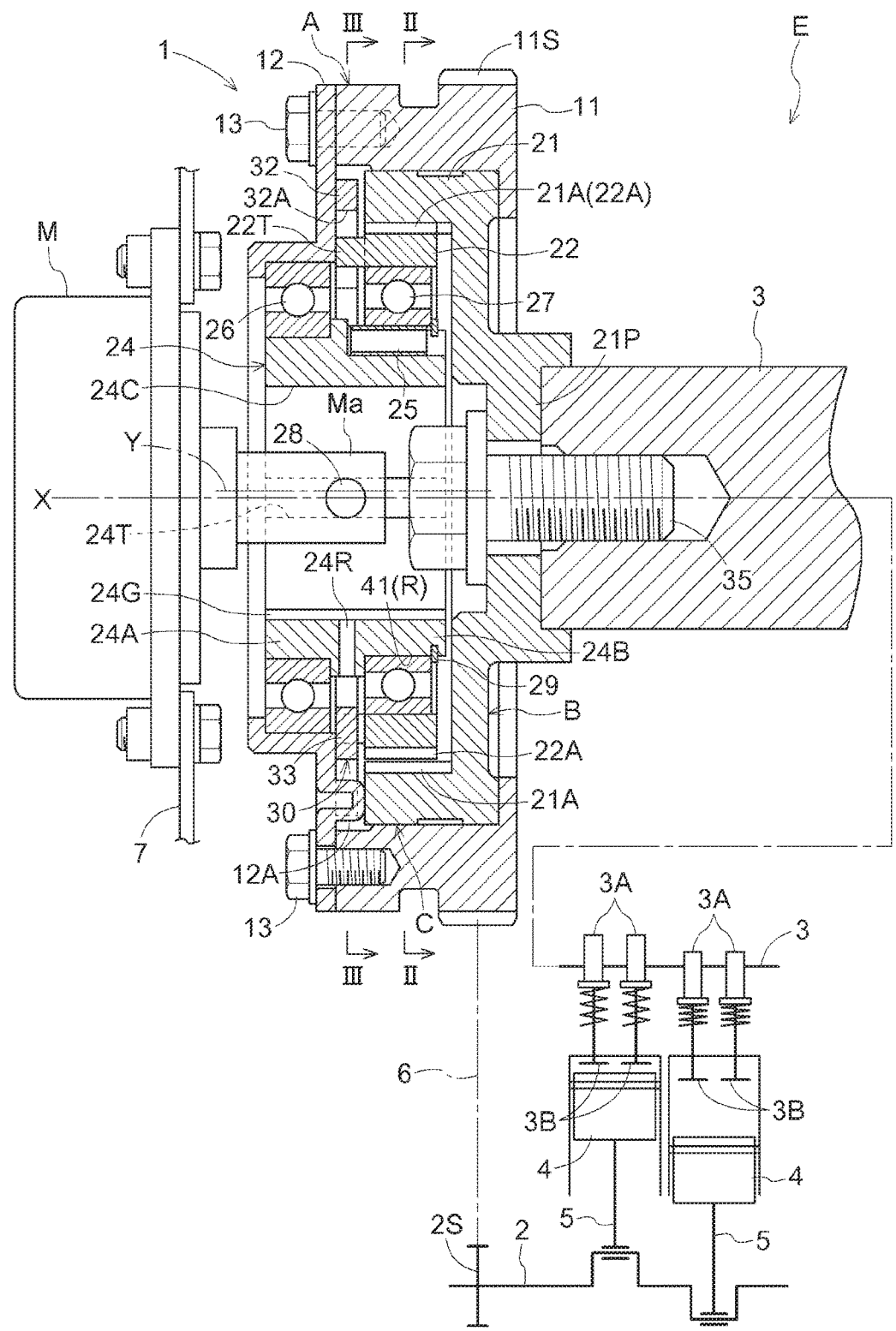
FIG. 1 is a cross-sectional view illustrating a valve opening and closing timing control apparatus.

Hereinafter, embodiments disclosed here will be described with reference to the accompanying drawings.

Basic Configuration

As illustrated in FIGS. 1 to 4, a valve opening and closing timing control apparatus 1 includes a driving side rotator A, which rotates synchronously with a crankshaft 2 of an engine E that is an internal combustion engine, a driven side rotator B, which rotates integrally with an intake camshaft 3, and a phase adjustment mechanism C, which sets a relative rotation phase between the driving side rotator A and the driven side rotator B by a driving force of a phase control motor M (an example of an electric actuator).

The engine E is configured in a four-cycle form in which pistons 4 are accommodated in a plurality of cylinder bores formed in a cylinder block and each piston 4 is connected to the crankshaft 2 via a connecting rod 5. A timing belt 6 (this may also be referred to as a timing chain) is wound around an output pulley 2S of the crankshaft 2 of the engine E and a driving pulley 11S of the driving side rotator A.

Therefore, when the engine E operates, the entire valve opening and closing timing control apparatus 1 rotates around a rotation axis X. In addition, the driven side rotator B is configured to be displaceable in the same rotation direction or in the reverse direction relative to the driving side rotator A by driving of the phase adjustment mechanism C.

In the valve opening and closing timing control apparatus 1, the driving of the phase control motor M is controlled by a control device such as an ECU, etc. The phase adjustment mechanism C sets a relative rotation phase between the driving side rotator A and the driven side rotator B under this control, and with this setting, the control of the opening/closing timing of intake valves 3B is realized by cam portions 3A of the intake camshaft 3.

Valve Opening and Closing Timing Control Apparatus

In the driving side rotator A, an outer case 11, which is provided with the driving pulley 11S, and a front plate 12 are fastened to each other using a plurality of fastening bolts 13. In the inner space of the outer case 11, the driven side rotator B and the phase adjustment mechanism C, which is configured with a hypotrochoid-type speed reduction gear (a concrete example of a differential speed reduction mechanism), are accommodated.

The driven side rotator B is configured with a ring gear 21, which is provided with an internal toothed portion 21A having a plurality of internal teeth. The phase adjustment mechanism C includes the ring gear 21, an inner gear 22, which is provided with an external toothed portion 22A having a plurality of external teeth engaged with the internal toothed portion 21A of the ring gear 21, a drive shaft 24 fitted into the inner gear 22, and a joint member 30 as a link mechanism that links the inner gear 22 to the driving side rotator A.

Figure 2:
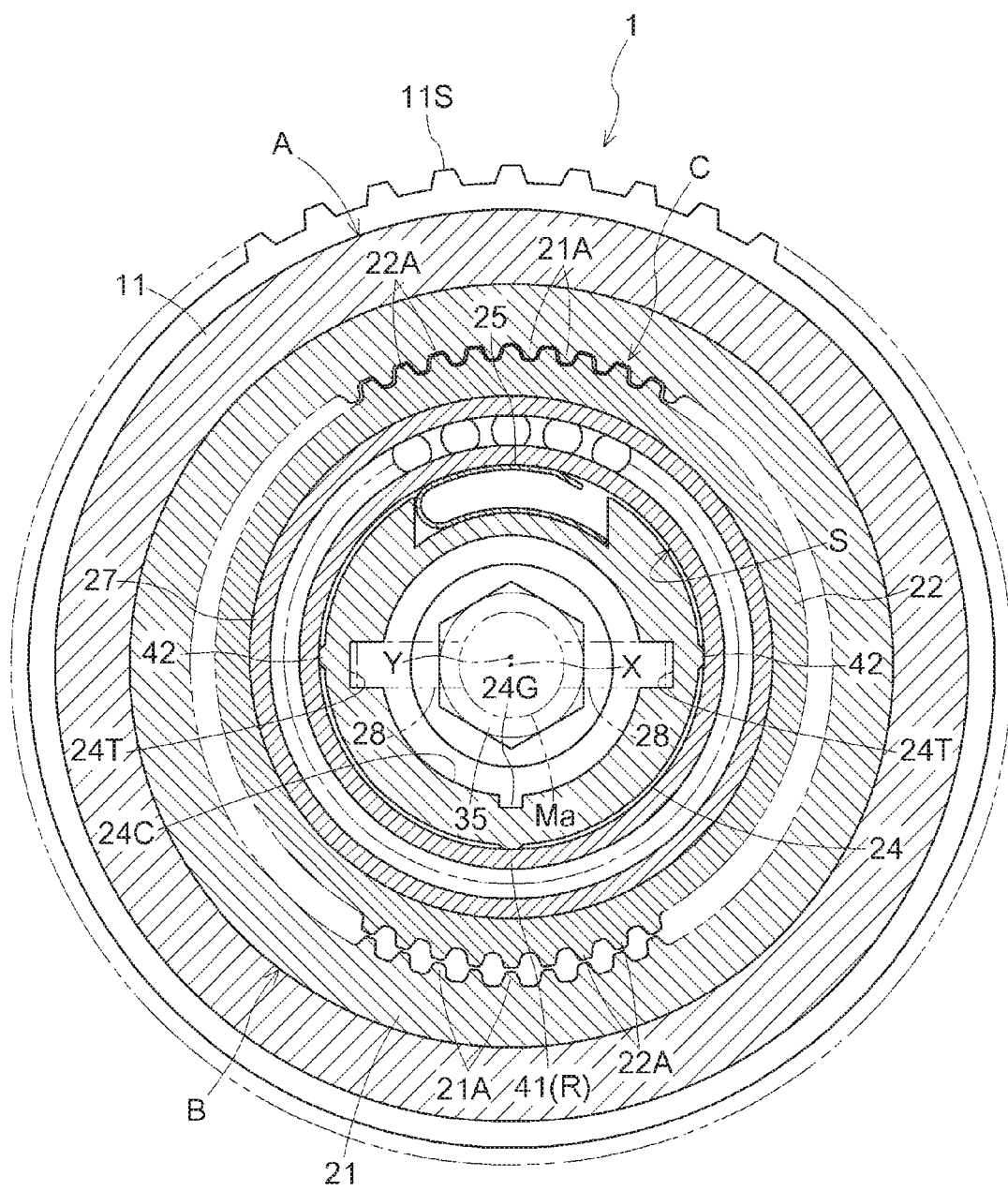
FIG. 2 is a cross-sectional view taken along line II-II of FIG. 1.

As illustrated in FIG. 2, the ring gear 21 is disposed coaxially with the rotation axis X, and the inner gear 22 is disposed coaxially with an eccentric axis Y, which has a posture parallel to the rotation axis X. A portion of the external toothed portion 22A is engaged with a portion of the internal toothed portion 21A of the ring gear 21, and the number of teeth of the external toothed portion 22A of the inner gear 22 is set to be smaller than the number of teeth of the internal toothed portion 21A of the ring gear 21 by one tooth.

As illustrated in FIGS. 1 to 4, the phase control motor M (electric motor) is supported on the engine E by a support frame 7 such that an output shaft Ma thereof is disposed coaxially with the rotation axis X.

The ring gear 21 has a structure in which a driven plate 21P, which has a posture orthogonal to the rotation axis X, is integrated with a ring-shaped portion on which the internal toothed portion 21A is formed. As a connection bolt 35 is inserted through a hole 24C in the center of the driven plate 21P and is screwed to the intake camshaft 3, the ring gear 21 is connected to the intake camshaft 3 so as to be located coaxially with the rotation axis X.

The drive shaft 24 is provided with a first support portion 24A having an outer peripheral surface about rotation axis X, on the outer end side thereof in the direction along the rotation axis X, and is provided with a second support portion 24B having an outer peripheral surface about the eccentric axis Y, on the inner end side thereof. One notch 24D is formed in the outer periphery of the second support portion 24B, and a spring 25, which serves as a biasing member, is fitted into the notch 24D. In addition, the hole 24C is formed in the drive shaft 24 about the rotation axis X, and a pair of engaging grooves 24T, into which an engaging member 28 of the output shaft Ma of the phase control motor M is engaged, is formed in the hole 24C so as to have a posture parallel to the rotation axis X.

Moreover, a single lubrication groove 24G, which has a posture parallel to the rotation axis X, is formed in the hole 24C, and a lubrication flow path 24R is formed to penetrate from the lubrication groove 24G to the outer surface. A pair of lubrication flow paths 24R is formed to penetrate from the pair of engaging grooves 24T to the outer surface.

As illustrated in FIG. 1, a first bearing 26, which is configured with a ball bearing, is disposed between an opening in the center of the front plate 12 and the first support portion 24A, so that the drive shaft 24 is supported to be rotatable relative to the driving side rotator A about the rotation axis X.

As illustrated in FIG. 2, a second bearing 27, which is configured with a ball bearing, is disposed between the inner periphery of the inner gear 22 and the second support portion 24B of the drive shaft 24, so that the second support portion 24B and the inner gear 22 are rotatable relative to each other about the eccentric axis Y. In addition, the biasing force of the spring 25 is applied to the inner peripheral surface S of the second bearing 27. Moreover, when a C-ring 29 as a stop ring is provided, separation of the second bearing 27 from the second support portion 24B is prevented (see FIGS. 1 and 4).

Therefore, the inner gear 22 is rotatably supported about the eccentric axis Y, and as illustrated in FIG. 2, a portion of the external toothed portion 22A is engaged with a portion of the internal toothed portion 21A of the ring gear 21, and the engagement is maintained by the biasing force of the spring 25. In addition, an operation mode of setting a relative rotational phase between the driving side rotator A and the driven side rotator B by the valve opening and closing timing control apparatus 1 will be described below.

Phase Adjustment Mechanism: Joint Member

Figure 4:
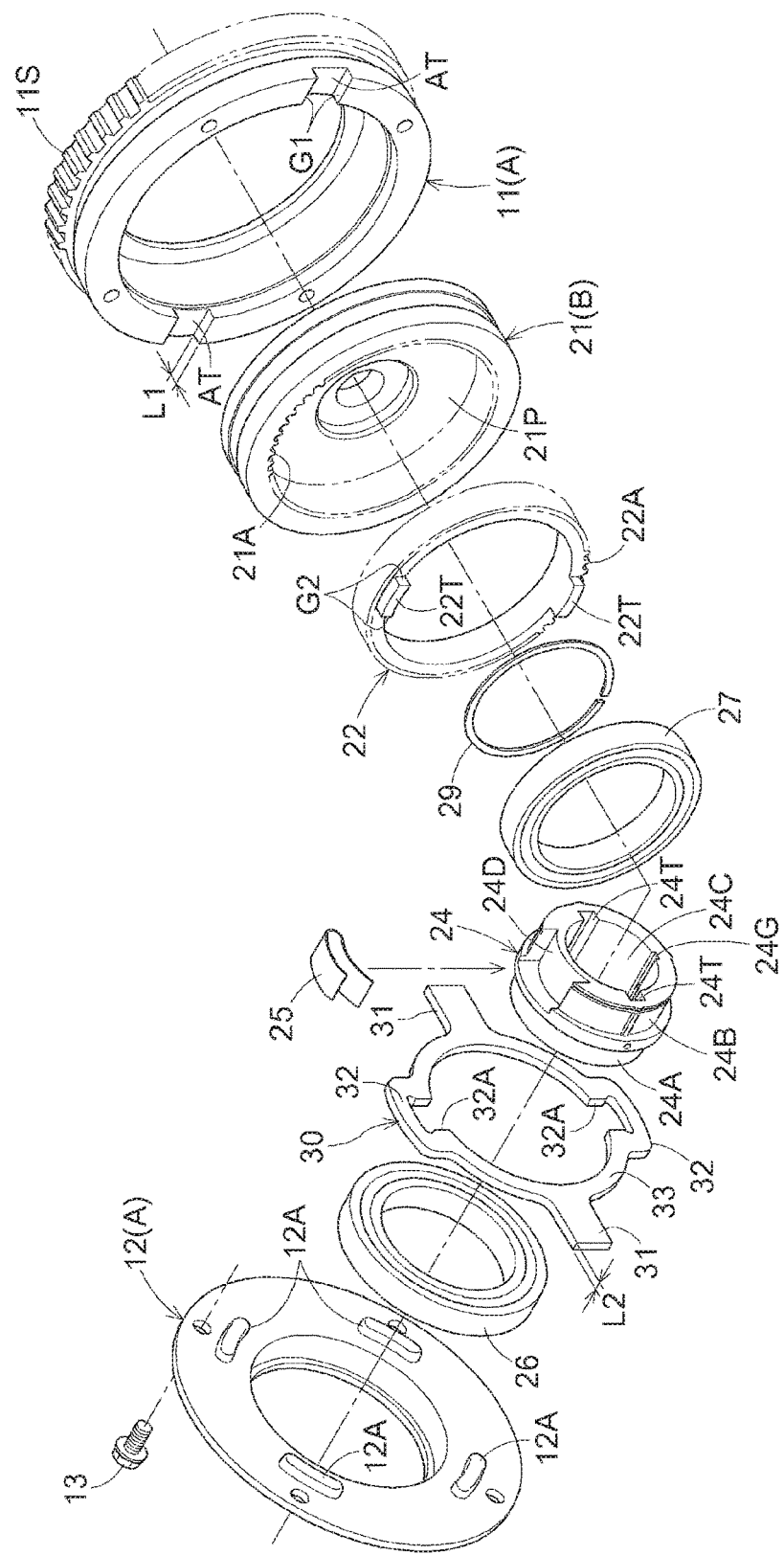
FIG. 4 is an exploded perspective view of the valve opening and closing timing control apparatus.

As illustrated in FIG. 4, the joint member 30, which constitutes the link mechanism, is manufactured by, for example, pressing a plate member. In the joint member 30, a pair of first engaging arms 31, which protrudes outward about the rotation axis X, a pair of second engaging arms 32, which protrudes in the direction orthogonal to the first engaging arms 31, and a ring-shaped portion 33, which interconnects the same, are integrally formed with one another. The second engaging arms 32 are provided respectively with engaging recesses 32A, which are open toward the rotation axis X.

When viewing the joint member 30 in the direction along the rotation axis X, the first engaging arms 31 are configured with plate-shaped areas, which linearly extend in a first direction, and the engaging recesses 32A of the second engaging arms 32 are concavely formed so as to be recessed in a second direction orthogonal to the first direction. In addition, the pair of first engaging arms 31, the pair of second engaging arms 32 and the ring-shaped portion 33 interconnecting the same are disposed in an imaginary plane orthogonal to the rotation axis X.

The outer case 11, which constitutes the driving side rotator A, is provided, with a pair of first link portions AT, which are formed in a through-hole shape to extend in the radial direction about the rotation axis X from the inner space to the outer space of the outer case 11, on a connection surface thereof, which is in contact with the front plate 12. The straight direction in which the pair of first link portions AT is arranged parallel to each other is the first direction (the horizontal direction in FIG. 3). In addition, the inner gear 22 is provided with a pair of second link portions 22T, which is formed in a protrusion shape at positions facing each other with the eccentric axis Y interposed therebetween, on the end surface thereof. The direction in which the pair of second link portions 22T is arranged parallel to each other is the second direction (the vertical direction in FIG. 3).

Figure 3:
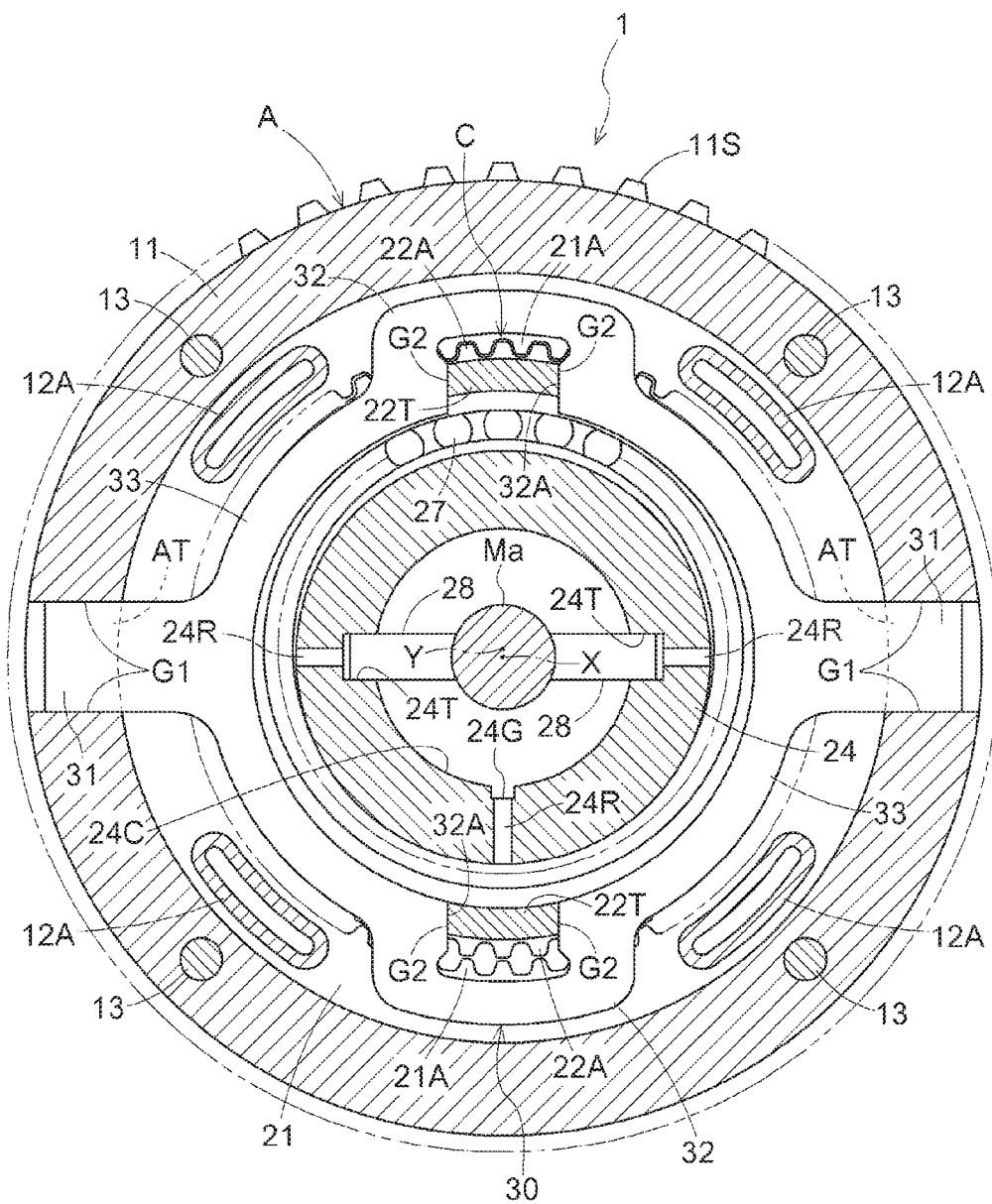
FIG. 3 is a cross-sectional view taken along line III-III of FIG. 1.

As illustrated in FIGS. 3 and 4, each first link portion AT is provided with a pair of first guide surfaces G1, which has a posture parallel to the first direction when viewing in the direction along the rotation axis X. In addition, each second link portion 22T is formed as a rectangular portion having a pair of second guide surfaces G2, which has a posture parallel to the second direction when viewing in the direction along the rotation axis X.

With this configuration, when the first engaging arms 31 of the joint member 30 are engaged with the first link portions AT and the engaging recesses 32A of the second engaging arms 32 of the joint member 30 are engaged with the second link portions 22T, the link member 30 may function as an Oldham's coupling.

In addition, in this configuration, there is a positional relationship in which linear portions of the first engaging arms 31 come into contact with the first guide surfaces G1 of the first link portions AT and linear portions of the recesses of the second engaging arms 32 come into contact with the second guide surfaces G2 of the second link portions 22T.

As illustrated in FIG. 4, the recessed depth L1 of the first link portion AT is set to a sufficiently larger value than the thickness L2 of the first engaging arm 31. Thus, when the front surface of the first engaging arm 31 and the front plate 12 come into contact with each other, a gap is formed between the rear surface of the first engaging arm 31 and the bottom portion of the first link portion AT.

Moreover, a plurality of protrusions 12A protrudes from the inner surface of the front plate 12 and determines the position of the ring gear 21 in the direction along the rotation axis X by coming into contact with the end surface of the ring gear 21.

Operation Mode of Phase Adjustment Mechanism

In the valve opening and closing timing control apparatus 1, a control device (not illustrated) is provided to control the phase control motor M, and when maintaining a relative rotational phase between the driving side rotator A and the driven side rotator B, the drive shaft 24 is rotated at the same speed as the rotation speed of the intake camshaft 3.

On the other hand, when setting a relative rotational phase between the driving side rotator A and the driven side rotator B to a target phase, the output shaft Ma of the phase control motor M is rotated at a higher or lower speed than the rotation speed of the intake camshaft 3.

Therefore, the eccentric axis Y of the second support portion 24B revolves around the rotation axis X, and with this revolution, the engagement position of the internal toothed portion 21A of the ring gear 21 with respect to the external toothed portion 22A of the inner gear 22 is displaced along the inner periphery of the ring gear 21, and simultaneously, the inner gear 22 spins on the eccentric axis Y.

When the eccentric axis Y of the inner gear 22 revolves around the rotation axis X, because the displacement of the inner gear 22 is transmitted from the second link portion 22T to the engaging recess 32A, the joint member 30 operates to be displaced in the first direction and the second direction so that the driven side rotator B is rotated relative to the driving side rotator A by an angle that corresponds to the amount of relative displacement between the ring gear 21 and the inner gear 22, whereby the control of the valve opening/closing time is realized.

Specifically, because the number of teeth of the external toothed portion 22A of the inner gear 22 is set to be smaller by only one tooth than the number of teeth of the internal toothed portion 21A of the ring gear 21, when the eccentric axis Y of the inner gear 22 revolves once around the rotation axis X, a speed reduction transmission state where a rotational force is applied to the ring gear 21 by an angle that corresponds to one tooth is obtained to realize large speed reduction.

In addition, upon this speed reduction, because the relative rotation between the inner gear 22 and the outer case 11, which constitutes the driving side rotator A, is regulated by the joint member 30, the ring gear 21 is rotated about the rotation axis X by the rotational force acting such that the inner gear 22 spins as the inner gear 22 revolves. That is, as the inner gear 22 revolves with respect to the ring gear 21, the ring gear 21 is rotated on the basis of the driving side rotator A, and consequently, a relative rotation phase between the driving side rotator A and the driven side rotator B is set to realize the setting of the opening/closing time by the intake camshaft 3.

The valve opening and closing timing control apparatus 1 is disposed inside a case of a chain, which is driven by the intake camshaft 3 and an exhaust camshaft of the engine E. With such a positional relationship, some of a lubricating oil supplied to the camshaft or the chain moves from the opening in the center of the front plate 12 into the hole 24C in the drive shaft 24 to thereby be supplied to each part in the inner space of the outer case 11, thereby ensuring smooth operation of the phase adjustment mechanism C.

Displacement Regulation Portion

As illustrated in FIG. 2, in this embodiment, although the inner peripheral surface S of the second baring functions as the inner peripheral surface of the inner gear 22 because the second bearing 27, which is formed in a ring shape, is fitted into the inner peripheral surface of the inner gear 22, a configuration in which the spring 25 comes into contact with the inner peripheral surface of the inner gear 22 without using the second bearing 27 may be adopted.

In addition, in this embodiment, because the inner peripheral surface S of the second bearing 27 functions as the inner peripheral surface of the inner gear 22, a first contact portion 41 which is configured as displacement regulation portions R to be described below are brought into contact with the inner peripheral surface S of the second bearing 27. Instead of this configuration, the first contact portion 41 may be brought into contact with the inner peripheral surface of the inner gear 22 without using the second bearing 27.

In addition, a bush-shaped second bearing 27 may be provided on the inner periphery of the inner gear 22 such that the inner periphery of the second bearing 27 functions as the inner periphery of the inner gear 22. In addition, in the same manner as this, a pair of second contact portions 42 to be described below may be brought into contact with the inner peripheral surface of the inner gear 22, or may be brought into contact with the inner periphery of the bush-shaped second bearing 27.

Figure 5:
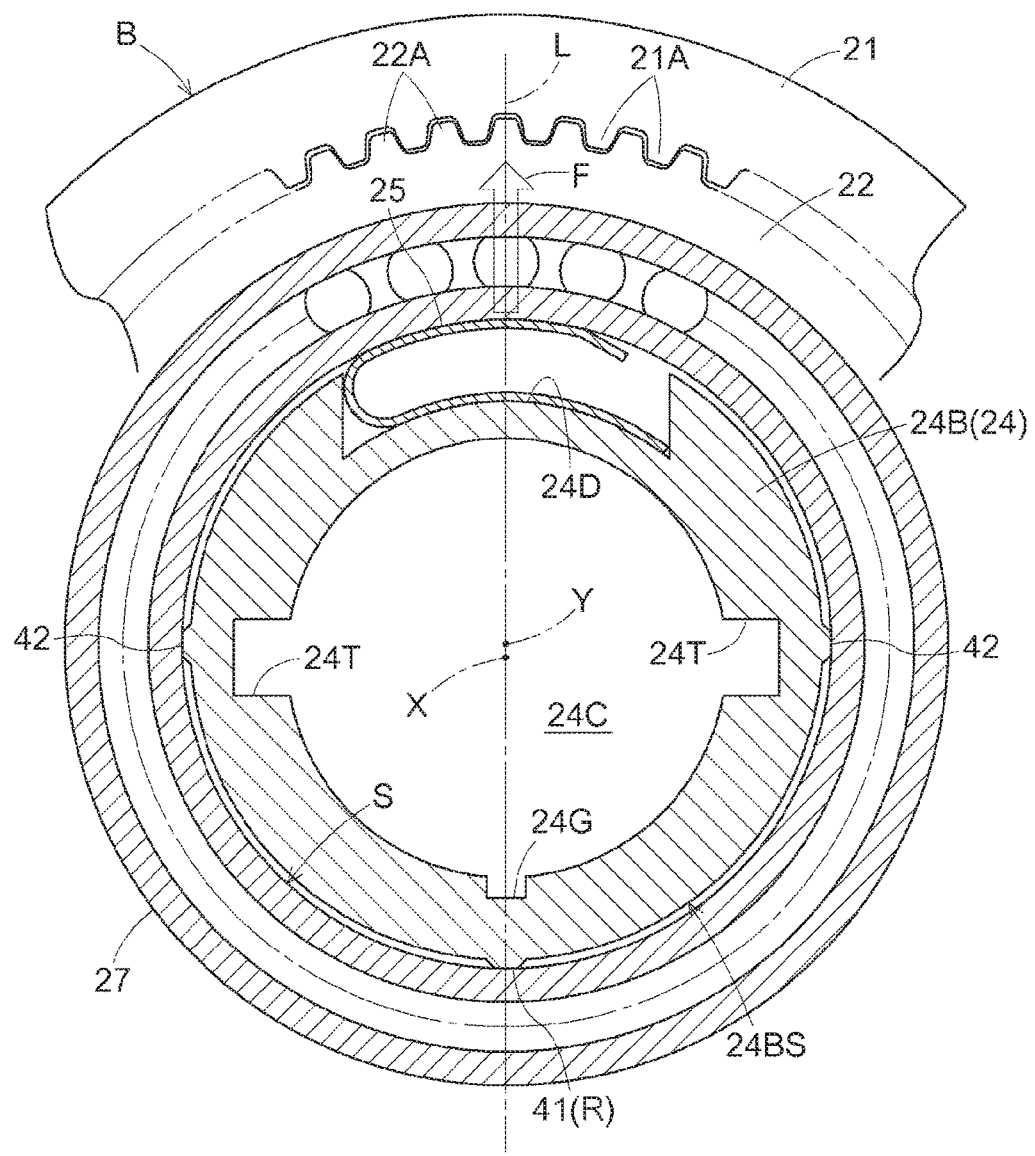
FIG. 5 is an enlarged cross-sectional view illustrating a relationship between a displacement regulation portion and a biasing direction of a spring.

As illustrated in FIG. 5, assuming that an imaginary straight line that interconnects the rotation axis X and the eccentric axis Y is a deviation directional line L, the biasing direction F in which the biasing force is applied from the spring 25 to the inner gear 22 (the inner periphery of the second bearing 27) coincides with the deviation directional line L.

As described above, the first support portion 24A of the drive shaft 24 is supported on the front plate 12 via the first bearing 26 so as to be rotatable about the rotation axis X, and the spring 25 is provided so as to be fitted into the notch 24D in the outer periphery of the second support portion 24B of the drive shaft 24.

Due to this configuration, for example, in a configuration in which the inner gear 22 is not regulated, when a large biasing force is applied from the spring 25, the external toothed portion 22A of the inner gear 22 and the internal toothed portion 21A of the ring gear 21 come into strong contact with each other, which increases engagement damage. Moreover, the engagement depth is increased, causing the engagement area to be enlarged in the circumferential direction of the inner gear 22. For this reason, a load required to rotate the drive shaft 24 is increased, which deteriorates responsiveness.

In order to suppress this problem, as illustrated in FIG. 5, the displacement regulation portion R is provided to regulate displacement of the inner gear 22 in the biasing direction F. The displacement regulation portion R is configured with the first contact portion 41, which protrudes from the outer peripheral surface 24BS of the second support portion 24B of the drive shaft 24 in the direction, which is opposite to the biasing direction F on the basis of the eccentric axis Y, so as to come into slight contact with the inner peripheral surface S of the second bearing 27.

In addition, the outer peripheral surface 24BS of the second support portion 24B is formed to have a slightly smaller diameter than that of the inner peripheral surface S of the second bearing 27 (the inner peripheral surface of an inner race), and a gap is formed between the outer peripheral surface 24BS and the inner peripheral surface S of the second bearing 27. In addition, the outer peripheral surface 24BS of the second support portion 24B is formed with the pair of second contact portions 42, which protrudes outward from the largest diameter region in the direction orthogonal to the biasing direction F (the deviation directional line L) so as to come into slight contact with the inner peripheral surface S of the second bearing 27. Meanwhile, although the gap between the outer peripheral surface 24BS and the inner peripheral surface S of the second bearing 27 is small, it is exaggerated in the drawing.

With this configuration, even in a situation where the biasing force of the spring 25 is applied in the direction in which the inner gear 22 is displaced on the basis of the drive shaft 24 so as to be engaged with the ring gear 21, the first contact portion 41 comes into slight contact with the inner periphery of the second bearing 27, thereby regulating displacement of the inner gear 22. With this regulation, the engagement depth of the internal toothed portion 21A and the external toothed portion 22A is maintained to a predetermined value. In particular, because it is unnecessary to greatly deform the spring 25 (because the actual operation distance may be reduced), the durability of the spring 25 may be increased.

As a result, contact surface pressures of the internal toothed portion 21A and the external toothed portion 22A are reduced, which may reduce engagement damage and may realize improved responsiveness. In addition, because it is unnecessary to bring the outer periphery of the second support portion 24B of the drive shaft 24 into contact with the inner periphery of the second bearing 27 over a wide area, good engagement of the ring gear 21 and the inner gear 22 is maintained.

In addition, when the pair of second contact portions 42 is formed, displacement of the inner gear 22 on the basis of the drive shaft 24 in the direction orthogonal to the biasing direction F (the deviation directional line L) is also regulated. Thereby, even when a cam fluctuation torque is applied, contact between the internal toothed portion 21A and the external toothed portion 22A may be suppressed, which may suppress generation of abnormal noise upon contact between toothed surfaces. That is, because the engagement depth of the internal toothed portion 21A and the external toothed portion 22A is regulated, although displacement of the drive shaft 24 in the direction orthogonal to the biasing direction F (the deviation directional line L) is allowed, displacement of the inner gear in the direction orthogonal to the biasing direction F is regulated, which suppresses generation of abnormal noise.

In the configuration of the present embodiment, because the relative rotation phase may be set to achieve good responsiveness, for example, when stopping the engine E, the time taken until the engine E is completely stopped may be reduced by a quick operation even when the valve opening and closing time apparatus 1 is controlled to achieve the relative rotation phase suitable for the starting of the engine E.

Another Embodiment

Embodiments disclosed here may be configured as follows, in addition to the above-described embodiment (the same numbers and reference numerals will be given to those having the same function as the embodiment).

Figure 6:
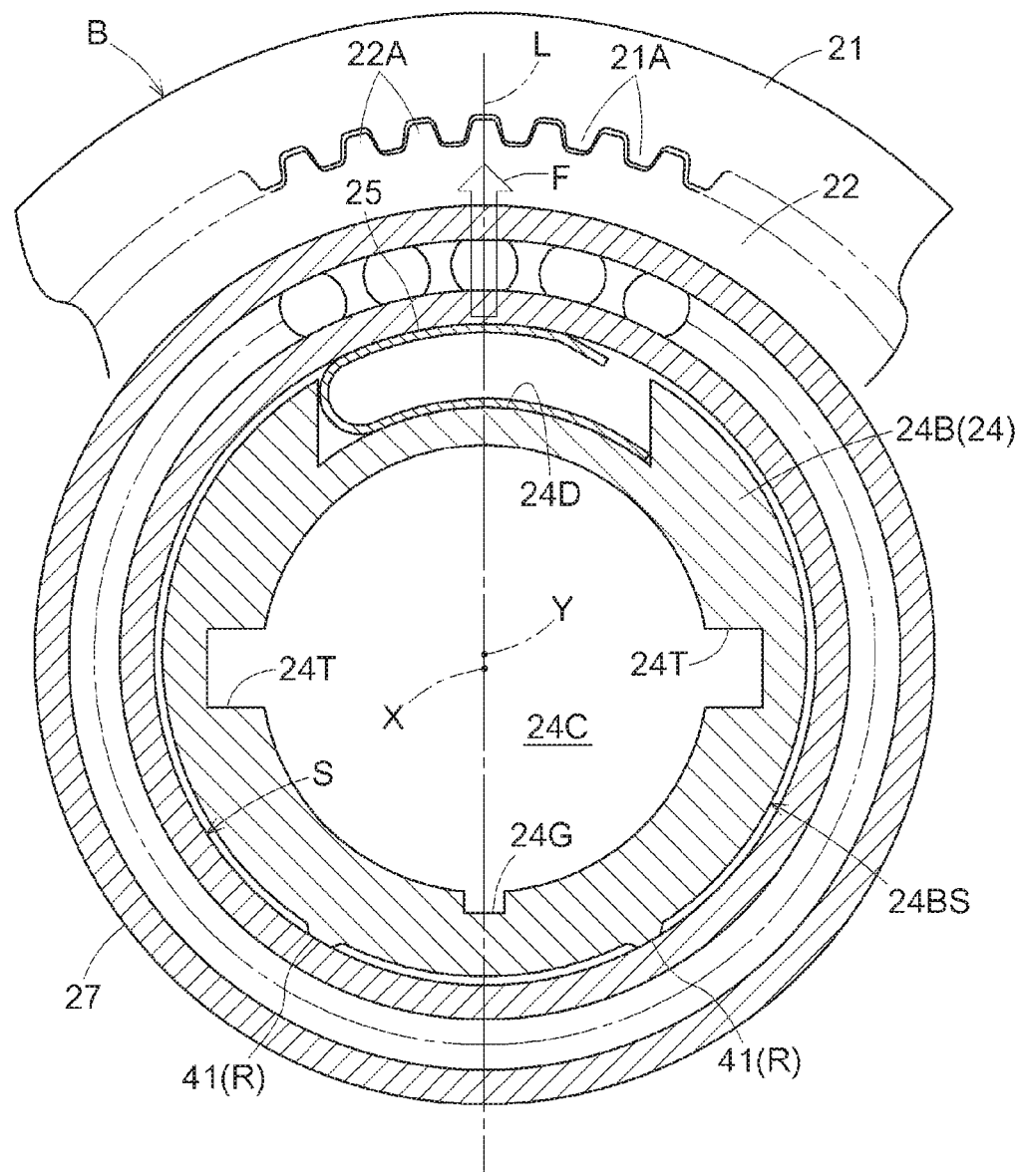
FIG. 6 is an enlarged cross sectional view illustrating the displacement regulation portion according to another embodiment (a)

(a) As illustrated in FIG. 6, as the displacement regulation portion R, first contact portions 41 are formed on the outer periphery of the second support portion 24B of the drive shaft 24 at two positions that are symmetrical about the point at which the deviation directional line L crosses with the inner peripheral surface S at the side opposite to the spring 25 (the side opposite to the biasing direction F) (two positions that equally receive a pressure from the drive shaft 24). In this embodiment, except for the first contact portions 41 provided at two positions, a slight gap is formed between the outer peripheral surface 24BS of the second support portion 24B of the drive shaft 24 and the inner peripheral surface S of the second bearing 27. Meanwhile, although the gap between the outer peripheral surface 24BS and the inner peripheral surface S of the second bearing 27 is small, it is exaggerated in the drawing.

When the first contact portions 41 are formed at two positions as described above, the engagement depth of the internal toothed portion 21A and the external toothed portion 22A may be maintained to a constant value by the biasing force applied from the spring 25 to the inner gear 22. Because the first contact portions 41 provided at two positions equally receive a pressure from the drive shaft 24, surface pressures of the internal toothed portion 21A and the external toothed portion 22A may be equally reduced, which ensures smooth change in the engagement position.

In addition, when the two first contact portions 41 are formed, the posture of the inner gear 22 relative to the drive shaft 24 may be stabilized, and displacement of the inner gear 22 on the basis of the drive shaft 24 in the direction orthogonal to the biasing direction F (the deviation directional line L) may also be regulated. For example, even when a cam fluctuation torque is applied, contact between the internal toothed portion 21A and the external toothed portion 22A may be suppressed, which may also suppress generation of abnormal noise upon contact of toothed surfaces.

Figure 7:
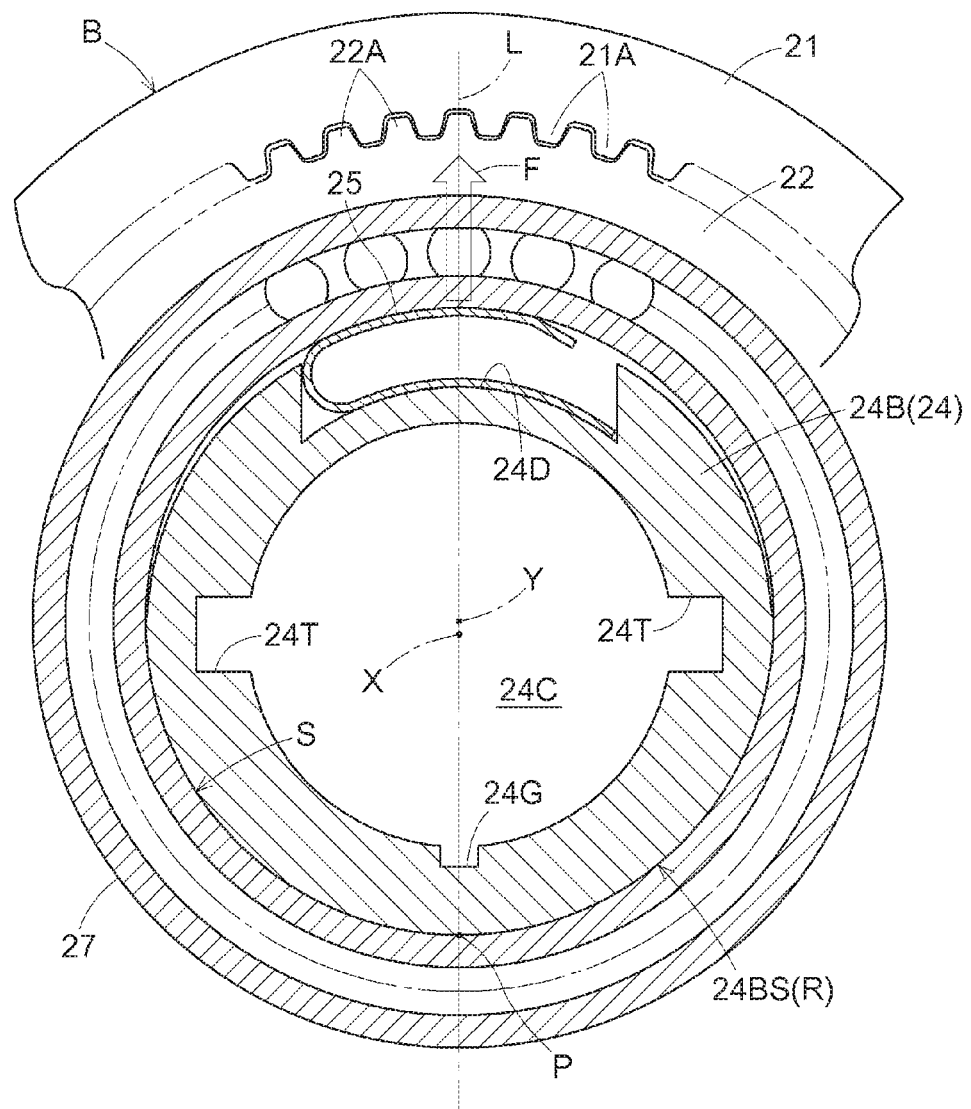
FIG. 7 is an enlarged cross sectional view illustrating the displacement regulation portion according to a further embodiment (b).

(b) As illustrated in FIG. 7, the displacement regulation portion R is configured by setting the outer diameter of the outer peripheral surface 24BS of the second support portion 24B of the drive shaft 24 to the same value as the inner diameter of the inner peripheral surface S of the second bearing 27. In this configuration, the second support portion 24B functions as the displacement regulation portion R, and a point P on the outer peripheral surface 24BS of the second support portion 24B, which crosses with the deviation directional line L at the side opposite to the biasing direction F, most strongly comes into strong contact with the inner peripheral surface S of the inner race of the second bearing 27.

In addition, because the outer peripheral surface 24BS comes into contact with the inner peripheral surface S of the second bearing 27 within a range of 180 degrees about the eccentric axis Y, the outer peripheral surface of the drive shaft 24 is spaced apart from the inner peripheral surface S of the second bearing 27 at the side opposite to the outer peripheral surface 24BS with the eccentric axis Y interposed therebetween (the area including the space in which the spring 25 is disposed), whereby a gap is formed in this region.

In this configuration, the outer peripheral surface of the drive shaft 24 comes into close contact with the inner peripheral surface S of the second bearing 27, which may regulate displacement of the inner gear 22 in the biasing direction F, and may suppress displacement of the inner gear 22 in the direction orthogonal to the biasing direction F (the deviation directional line L). In addition, in the configuration of this embodiment (b), manufacture is easy compared to the configuration in which the first contact portion 41 described above protrudes, and there is no deterioration in the strength of the drive shaft 24.

(c) In this embodiment, only a single first contact portion 41 is formed on the drive shaft 24 without the second contact portion 42. When the second contact portion 42 is omitted, resistance against rotation of the drive shaft 24 is further reduced.

(d) Contrary to the embodiments, the valve opening and closing timing control apparatus 1 is configured such that, as the phase adjustment mechanism C, the ring gear 21 is linked to the driven side rotator B and the inner gear 22 is linked to the driving side rotator A. This configuration also realizes satisfactory speed reduction.

(e) The direction in which the spring 25 as a biasing mechanism applies a biasing force is set to a position that is spaced apart from the deviation directional line L. That is, it is unnecessary to apply the biasing force of the spring 25 in the direction along the deviation directional line L in order to maintain the engaged state of the internal toothed portion 21A and the external toothed portion 22A, and for example, it is conceivable that the biasing direction is set to a direction in consideration of the driving-reaction force of the camshaft or the cam fluctuation torque.

This disclosure may be used in a valve opening and closing timing control apparatus that sets a relative rotation phase between a driving side rotator and a driven side rotator by an electric actuator.

A feature of an aspect of this disclosure resides in that a valve opening and closing timing control apparatus includes a driving side rotator disposed rotatably about a rotation axis and configured to rotate synchronously with a crankshaft of an internal combustion engine, a driven side rotator disposed rotatably about the rotation axis and configured to be rotatable relative to the driving side rotator and to rotate integrally with a valve opening/closing camshaft of the internal combustion engine, and a phase adjustment mechanism configured to set a relative rotation phase between the driving side rotator and the driven side rotator by a driving force of an electric actuator, wherein the phase adjustment mechanism includes an internal toothed ring gear disposed coaxially with the rotation axis, an inner gear disposed coaxially with an eccentric axis in a posture parallel to the rotation axis such that an external toothed portion thereof is engaged with a portion of an internal toothed portion of the ring gear, and a drive shaft fitted into the inner gear, wherein the phase adjustment mechanism is configured with a differential speed reduction mechanism in which the drive shaft is rotated about the rotation axis by the driving force of the electric actuator such that the inner gear revolves around the rotation axis while spinning on the eccentric axis, and wherein the valve opening and closing timing control apparatus further includes a biasing member provided on an outer periphery of the drive shaft to apply a biasing force in a direction such that the external toothed portion of the inner gear is engaged with the internal toothed portion of the ring gear, and a displacement regulation portion configured to regulate a displacement of the inner gear on the basis of the drive shaft in a biasing direction of the biasing member.

With this configuration, because displacement of the inner gear on the basis of the drive shaft in the direction in which the inner gear is engaged with the ring gear by the biasing force of the biasing member is regulated by the displacement regulation portion, the engagement depth of the internal toothed portion and the external toothed portion may be maintained to a predetermined value. In addition, through the provision of the displacement regulation portion, because contact surface pressures of the internal toothed portion and the external toothed portion may be reduced and it is unnecessary to greatly deform the biasing member (because the actual operation distance may be reduced), the durability of the biasing member is increased. In addition, because it is unnecessary to bring the outer periphery of the drive shaft into contact with the inner periphery of the inner gear over a wide area, resistance caused when the drive shaft is rotated may be reduced.

Accordingly, the valve opening and closing timing control apparatus is configured so as to reduce the biasing force of the biasing member and to increase a response speed while maintaining good engagement of the ring gear and the inner gear.

As another configuration, the displacement regulation portion may be formed by a contact portion, which protrudes from an outer peripheral surface of the drive shaft at a side opposite to the biasing member with the eccentric axis interposed therebetween so as to be brought into contact with an inner peripheral surface of the inner gear.

Accordingly, when the contact portion protrudes from a portion of the outer peripheral surface of the drive shaft, displacement of the inner gear in the direction in which the inner gear is engaged with the ring gear is regulated and the contact area of the drive shaft and the inner gear is reduced, which enables a reduction in resistance upon relative rotation of the drive shaft and the inner gear.

As another configuration, the displacement regulation portion may be formed by contact portions, which protrude from an outer peripheral surface of the drive shaft at two positions, which equally receive a pressure from the drive shaft at a side opposite to the biasing member with the eccentric axis interposed therebetween, so as to be brought into contact with an inner peripheral surface of the inner gear.

With this configuration, when the contact portions protrude from a portion of the outer peripheral surface of the drive shaft, displacement of the inner gear in the direction in which the inner gear is engaged with the ring gear is regulated and the contact area of the drive shaft and the inner gear is reduced, which enables a reduction in resistance upon relative rotation of the drive shaft and the inner gear. In addition, in this configuration, because the contact portions are provided at two positions, the posture of the inner gear may be stabilized. Moreover, because the contact portions provided at two positions equally receive a pressure from the drive shaft, surface pressures of the internal toothed portion and the external toothed portion may be equally reduced, which ensures smooth change in engagement position.

As another configuration, the displacement regulation portion may be configured by setting an outer diameter of an outer peripheral surface of the drive shaft at a side opposite to the biasing member with the eccentric axis interposed therebetween to the same value as an inner diameter of an inner peripheral surface of the inner gear.

With this configuration, deterioration in strength may not be caused because the diameter of the drive shaft is not reduced, and a gap between the outer periphery of the drive shaft and the inner periphery of the inner gear is reduced, which allows a lubrication oil to be held in the gap. In addition, in this configuration, manufacture becomes easy compared that a protrusion is provided on the outer periphery of the drive shaft.

As another configuration, the inner gear may be provided with a ring-shaped bearing on an inner periphery thereof so that an inner peripheral surface of the bearing functions as the inner peripheral surface of the inner gear.

With this configuration, even in a configuration in which a bearing such as a ball bearing, etc. is provided, when the inner periphery of the bearing functions as the inner periphery of the inner gear, the biasing force of the biasing member may be reduced, which may maintain good engagement between the ring gear and the inner gear and may increase a response speed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve opening and closing timing control apparatus comprising:
    a driving side rotator disposed rotatably about a rotation axis and configured to rotate synchronously with a crankshaft of an internal combustion engine;
    a driven side rotator disposed rotatably about the rotation axis and configured to be rotatable relative to the driving side rotator and to rotate integrally with a valve opening/closing camshaft of the internal combustion engine; and
    a phase adjustment mechanism configured to set a relative rotation phase between the driving side rotator and the driven side rotator by a driving force of an electric actuator,
    wherein the phase adjustment mechanism includes:
        an internal toothed ring gear disposed coaxially with the rotation axis;
        an inner gear disposed coaxially with an eccentric axis in a posture parallel to the rotation axis such that an external toothed portion thereof is engaged with a portion of an internal toothed portion of the ring gear; and
        a drive shaft fitted into the inner gear,
    the phase adjustment mechanism is configured with a differential speed reduction mechanism in which the drive shaft is rotated about the rotation axis by the driving force of the electric actuator such that the inner gear revolves around the rotation axis while spinning on the eccentric axis, and
    the valve opening and closing timing control apparatus further comprises:
        a spring fitted into a notch which is formed in an outer periphery of the drive shaft, the external toothed portion of the inner gear being configured to engage with the internal toothed portion of the ring gear by a biasing force applied by the spring; and
        a displacement regulation portion configured to regulate a displacement of the inner gear on the basis of the drive shaft in a biasing direction of the biasing member,
    wherein the displacement regulation portion is formed by a contact portion, which protrudes from an outer peripheral surface of the drive shaft at a side opposite to the spring with the eccentric axis interposed therebetween so as to be brought into contact with an inner peripheral surface of the inner gear.

2. The valve opening and closing timing control apparatus according to claim 1,
    wherein the inner gear is provided with a ring-shaped bearing on an inner periphery thereof so that an inner peripheral surface of the bearing functions as the inner peripheral surface of the inner gear.

3. A valve opening and closing timing control apparatus comprising:
    a driving side rotator disposed rotatably about a rotation axis and configured to rotate synchronously with a crankshaft of an internal combustion engine;
    a driven side rotator disposed rotatably about the rotation axis and configured to be rotatable relative to the driving side rotator and to rotate integrally with a valve opening/closing camshaft of the internal combustion engine; and
    a phase adjustment mechanism configured to set a relative rotation phase between the driving side rotator and the driven side rotator by a driving force of an electric actuator,
    wherein the phase adjustment mechanism includes:
        an internal toothed ring gear disposed coaxially with the rotation axis;
        an inner gear disposed coaxially with an eccentric axis in a posture parallel to the rotation axis such that an external toothed portion thereof is engaged with a portion of an internal toothed portion of the ring gear; and
        a drive shaft fitted into the inner gear,
    the phase adjustment mechanism is configured with a differential speed reduction mechanism in which the drive shaft is rotated about the rotation axis by the driving force of the electric actuator such that the inner gear revolves around the rotation axis while spinning on the eccentric axis, and the valve opening and closing timing control apparatus further comprises:

a spring fitted into a notch which is formed in an outer periphery of the drive shaft, the external toothed portion of the inner gear being configured to engage with the internal toothed portion of the ring gear by a biasing force applied by the spring; and a displacement regulation portion configured to regulate a displacement of the inner gear on the basis of the drive shaft in a biasing direction of the biasing member, wherein the displacement regulation portion is formed by contact portions, which protrude from an outer peripheral surface of the drive shaft at two positions, which equally receive a pressure from the drive shaft at a side opposite to the spring with the eccentric axis interposed therebetween, so as to be brought into contact with an inner peripheral surface of the inner gear.

4. The valve opening and closing timing control apparatus according to claim 3, wherein the inner gear is provided with a ring-shaped bearing on an inner periphery thereof so that an inner peripheral surface of the bearing functions as the inner peripheral surface of the inner gear.

5. A valve opening and closing timing control apparatus comprising:

a driving side rotator disposed rotatably about a rotation axis and configured to rotate synchronously with a crankshaft of an internal combustion engine;

a driven side rotator disposed rotatably about the rotation axis and configured to be rotatable relative to the driving side rotator and to rotate integrally with a valve opening/closing camshaft of the internal combustion engine; and a phase adjustment mechanism configured to set a relative rotation phase between the driving side rotator and the driven side rotator by a driving force of an electric actuator, wherein the phase adjustment mechanism includes:

an internal toothed ring gear disposed coaxially with the rotation axis;

an inner gear disposed coaxially with an eccentric axis in a posture parallel to the rotation axis such that an external toothed portion thereof is engaged with a portion of an internal toothed portion of the ring gear; and a drive shaft fitted into the inner gear, the phase adjustment mechanism is configured with a differential speed reduction mechanism in which the drive shaft is rotated about the rotation axis by the driving force of the electric actuator such that the inner gear revolves around the rotation axis while spinning on the eccentric axis, and the valve opening and closing timing control apparatus further comprises:

a spring fitted into a notch which is formed in an outer periphery of the drive shaft, the external toothed portion of the inner gear being configured to engage with the internal toothed portion of the ring gear by a biasing force applied by the spring; and a displacement regulation portion configured to regulate a displacement of the inner gear on the basis of the drive shaft in a biasing direction of the biasing member, wherein the displacement regulation portion is configured by setting an outer diameter of an outer peripheral surface of the drive shaft at a side opposite to the spring with the eccentric axis interposed therebetween to the same value as an inner diameter of an inner peripheral surface of the inner gear.

6. The valve opening and closing timing control apparatus according to claim 5, wherein the inner gear is provided with a ring-shaped bearing on an inner periphery thereof so that an inner peripheral surface of the bearing functions as the inner peripheral surface of the inner gear.

* * * * *